US009594396B2

(12) United States Patent
Turner et al.

(10) Patent No.: US 9,594,396 B2
(45) Date of Patent: Mar. 14, 2017

(54) SYNCHRONIZING DATA TRANSFER BETWEEN A FIRST CLOCK DOMAIN AND SECOND CLOCK DOMAIN (75) Inventors: Edward James Turner, Bristol (GB); Jon Beecroft, Bristol (GB)

(73) Assignee: Cray UK Limited, Reading (GB)

( * ) Notice: Subject to any disclaimer, the term of this patent is extended or adjusted under 35 U.S.C. 154(b) by 262 days.

(21) Appl. No.: 13/703,582

(22) PCT Filed: Jul. 26, 2011

(86) PCT No.: PCT/GB2011/051428
§ 371 (c)(1),
(2), (4) Date: Jan. 12, 2013

(87) PCT Pub. No.: WO2012/013972
PCT Pub. Date: Feb. 2, 2012

(65) Prior Publication Data
US 2013/0205160 A1    Aug. 8, 2013

(30) Foreign Application Priority Data

Jul. 28, 2010 (GB) .................... 1012605.0

(51) Int. Cl.
*G06F 1/12* (2006.01)
*G06F 5/12* (2006.01)
*H04L 7/02* (2006.01)

(52) U.S. Cl.
CPC .......... *G06F 1/12* (2013.01); *G06F 5/12* (2013.01); *H04L 7/02* (2013.01)

(58) Field of Classification Search
CPC .......... G06F 1/12; G06F 5/12; H04L 7/02
See application file for complete search history.

(56) References Cited

U.S. PATENT DOCUMENTS 4,942,553 A * 7/1990 Dalrymple .............. G06F 13/28
710/57
5,426,756 A * 6/1995 Shyi ..................... G06F 5/14
365/189.07

(Continued)

FOREIGN PATENT DOCUMENTS

WO   WO-02/14992 A1   2/2002

OTHER PUBLICATIONS

Pong P. Chu, "RTL Hardware Design Using VHDL: Coding for Efficiency, Portability, and Scalability" (Apr. 14, 2006), Chapter 16.*

*Primary Examiner* — Jaweed A Abbaszadeh
*Assistant Examiner* — Brian J Corcoran
(74) *Attorney, Agent, or Firm* — Craig J. Lervick; Larkin Hoffman Daly & Lindgren Ltd.

(57) ABSTRACT

A data processing system comprises a first clock domain having a first clock rate, a second clock domain having a second clock rate, and a data path operable to transfer data items from the first clock domain to the second clock domain. The data path comprises a buffer having an input for receiving data items from the first clock domain, and an output port for transmitting data items to the second clock domain in a first-in first-out manner. The buffer has a first pointer for indication of a current first location of the buffer, and a second pointer for indication of a current second location of the buffer. The system further includes a read controller operable to define a read pattern for the buffer, to control output from the buffer in dependence upon such a read pattern, and to adjust such a read pattern in dependence upon a value of such a first pointer for the buffer.

22 Claims, 5 Drawing Sheets

(56) References Cited

U.S. PATENT DOCUMENTS

| | | | |
|---|---|---|---|
| 5,765,187 A * | 6/1998 | Shimizu | G06F 5/14 |
| | | | 710/22 |
| 5,894,567 A | 4/1999 | Dodd et al. | |
| 5,978,868 A * | 11/1999 | Maas | G06F 13/385 |
| | | | 709/234 |
| 6,424,688 B1 | 7/2002 | Tan et al. | |
| 6,711,696 B1 | 3/2004 | Bates et al. | |
| 6,748,039 B1 * | 6/2004 | Bates | G06F 5/10 |
| | | | 375/354 |
| 7,310,396 B1 | 12/2007 | Sabih | |
| 8,867,573 B2 * | 10/2014 | Kolinummi | G06F 13/4059 |
| | | | 365/221 |
| 2006/0277329 A1 * | 12/2006 | Paulson | G06F 5/10 |
| | | | 710/39 |
| 2007/0164787 A1 * | 7/2007 | Grochowski et al. | 326/46 |
| 2008/0034246 A1 | 2/2008 | Kelly | |
| 2008/0147914 A1 | 6/2008 | Williams et al. | |
| 2008/0215306 A1 * | 9/2008 | Lidji | G06F 5/12 |
| | | | 703/26 |

* cited by examiner

SYNCHRONIZING DATA TRANSFER BETWEEN A FIRST CLOCK DOMAIN AND SECOND CLOCK DOMAIN

BACKGROUND

The present invention relates to data processing systems, and, in particular, to data processing systems that have at least two clock domains between which data items pass.

Computer communication networks are normally constructed using switch ASICs (Application Specific Integrated Circuits). Switch ASICs come in a variety of types and sizes but in general larger networks usually require a number of switching ASICs that are put together to form a multi-stage network. The performance of a network can be measured with a large number of parameters, these include; bandwidth, latency, addressing, standards compliance and many more.

Reducing message latency is becoming more important as the bandwidth of communication links and performance of microprocessors increases. Message latency is the time it takes for a communication to take place. For large amounts of data the bandwidth of the communication link dominates. For small messages the bandwidth is less important and instead it is the time it takes for data to travel along a cable, to cross each of the switching elements and the adapters interfacing to the computers at each end that dominates the final latency value.

The cable delay can be minimised by using high quality copper cable with low relative permeability dielectric insulators. There is less scope for improvement with glass fibre optic cables other than to reduce the length of the cable.

High performance Serializer/Deserializers (SerDes) are used to interface functional blocks on a switch ASIC to either a copper or fibre cable. They convert parallel data on the ASIC into a high frequency serial bit stream at the transmitting end and take the weak signal available at the other end of the wire and convert it back to a parallel received data value. High frequency locally generated clocks are required to perform this function. The clocks used to transmit and receive the data in the SerDes are usually different from the main clock used to perform the function of the switching element or adapter connected to the communication link. They often run at a different frequency and can often be completely asynchronous with respect to the main clock. This is very common for the receive clock as the phase relationship between the incoming data and the local clock, delays in the logic and the length of the cable is usually unknown or not predictable. It is often convenient for the transmit clock and the system clock to be only loosely connected as this can significantly simplify the system design at the ASIC level.

Figure 1:
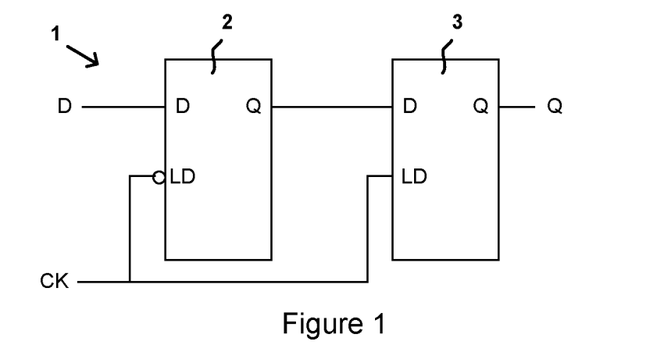
FIG. 1 illustrates a flip-flop.
Figure 2:
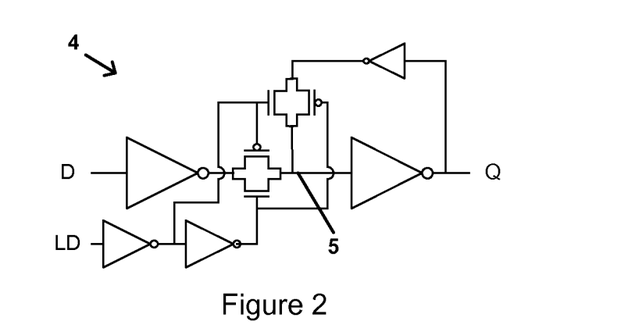
FIG. 2 illustrates an improved sampling flip-flop.

Synchronisation between clock domains is possible using sampling flip-flops such as that shown in FIG. 1 of the accompanying drawings. A flip-flop is a single bit of register state. A good sampling flip flop requires slightly different properties from a normal flip-flop. Flip-flops have a clock input (CK), a data input (D) and a data output (Q). Sometimes additional test circuitry is included and this usually takes the form of an additional input multiplexor that allows many flip-flops to be connected into a long shift register. This simplifies the process of inputting test data and outputting test results. Normally flip-flops are optimised to reduce the maximum delay from the input D to the Q output. The D input is usually sampled on the rising edge of the clock CK pin and the tighter the setup and hold window the better. Flip-flops 1 are usually constructed from two D type latches 2 and 3 placed one after the other as shown in FIG. 1. The first D type latch 2 is transparent when the clock input CK is low and the second 3 transparent when the clock input CK is high. This has the effect of sampling on the rising edge of the clock. While a D type latch is not sampling the input the circuit must have a way to remember the previously sampled value. This is normally done by feeding the output value back to the input. Sometimes this is done with a weak feedback inverter as it only has to hold the electrical charge loaded when the D input was being sampled. Without the weak inverter the charge could leak away and the stored value could be lost. FIG. 2 shows one circuit 4 for a CMOS D type latch that has a clocked feedback value onto a storage node 5. This allows a stronger inverter to be used to conditionally load the output onto the storage node when the D latch needs to remember the value that had been loaded.

A sampling flip-flop can try to load a value at the same time the value is changing. This would produce a timing violation in normal logic using normal flip-flops. In order to counter this problem, normal flip-flops define a setup and hold period around the rising edge of the clock during which the D input signal should be settled with a solid logic 0 or 1 value. If the setup/hold window is honoured the behaviour of the flip-flop is completely predictable. The behaviour of a sampling flip-flop is not predictable if the input is changing on the rising edge of the clock. The output could read one value and then change to another value some time after the rising edge of the clock. The flip-flop can be described as being metastable during this uncertain time. Like a carefully balanced inverted pendulum it could fall one way or the other. The more carefully it is balanced the longer it will hover in the inverted position before falling in one direction. Eventually it will decide but theoretically it could be undecided for an indefinite time. The probability of being undecided quickly becomes vanishingly small but there is always a finite possibility of being undecided.

It is not possible to prevent metastability but the chances of being affected by it can be reduced in two main ways.

1. Sampling flip-flops should always have a very strong conditionally loaded feedback value. The higher the loop gain, while the flip-flop is not sampling the input, the better. The loop gain can be further improved by minimising the output Q load with a small buffer and minimising the capacitive load from the loading transistors onto the storage node. This will encourage the flip-flop to come to a decision more quickly when the clock is in the hold level. Using the inverted pendulum metaphor this is equivalent to a stronger gravitational pull.

2. The other way is to increase the amount of time the flip-flop has to come to a decision. The probability of failure includes an exponential function on the time.

Figure 3:
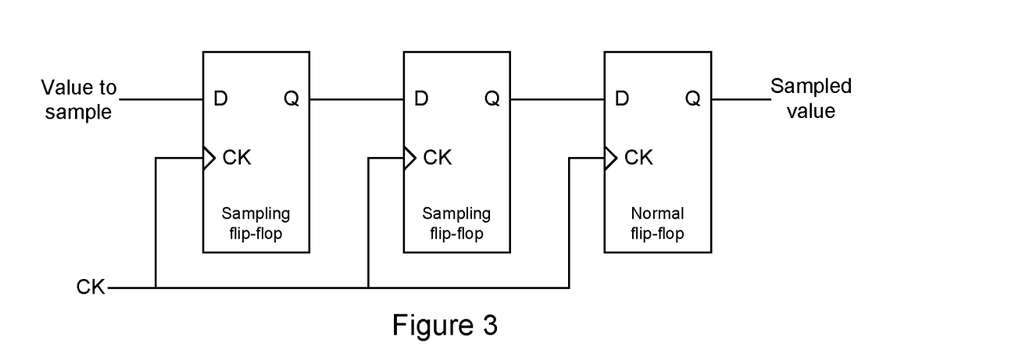
FIG. 3 illustrates a further improved sampling flip-flop.

The time available for a sampling flip-flop to make a decision on a silicon device usually relates to the clock cycle used on the ASIC. Often this is not long enough for the probability of failure to be small enough for failure during the lifetime of the product to be highly unlikely. Synchronising flip-flops can be pipelined effectively increasing the settling time by a whole cycle for each flip-flop added in the pipe. FIG. 3 gives an example of a pipelined synchronisation scheme where two whole cycles are available to allow a metastable state to drop out into a normal state. This technique is very successful and is used in many designs to give reliable operation on asynchronous internal interfaces. The phase relationship of the two clocks at the interface can be measured using pipelined synchronising flip-flops often sampling Gray coded counters. Usually the data is passed through a short FIFO being loaded in one clock domain and read in the other clock domain.

Figure 4:
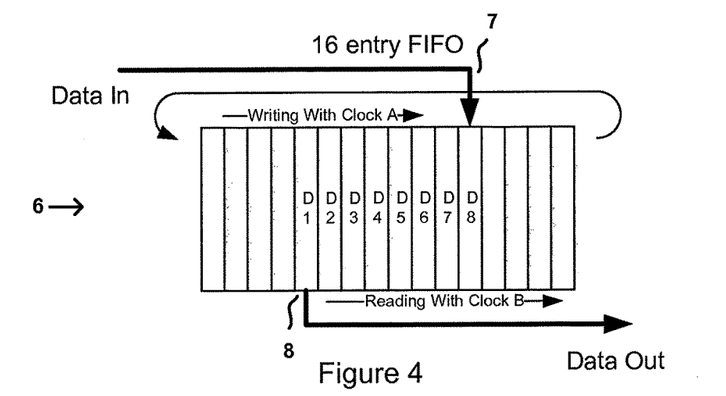
FIGS. 4 and 5 illustrate operation of respective first-in first-out buffers.

FIG. 4 gives an example phase aligning FIFO 6 constructed from sixteen registers. In the example data is written 7 into the FIFO 6 using clock A. Each new value is writing into the next entry as shown by the "Writing With Clock A" arrow. After the last register entry is written the write pointer will wrap back to the first entry as shown by the wrapping back pointer. In the example eight data values D1 to D8 have been written with D1 the first value to be written. The data is pulled 8 from the FIFO 6 using Clock B which reads data in the same order it was written. FIG. 4 shows the FIFO 6 being half full, with eight values out of the sixteen entries having valid data. This is the depth that is furthest away from either an underflow where the reading was faster than writing causing the read pointer to catch up with and overtake the write pointer and an overflow where writing was faster than reading.

Write and read clocks do not need to have the same frequency in order to avoid underflow or overflow. FIG. 4 shows a FIFO 6 where the amount of data written is the same as the amount of data read but the FIFO 6 can be constructed to allow a different number of bits written on each A clock compared with the amount read on each B clock. This can be a simple multiple but more complex configurations are possible. The FIFO 6 is usually used to realign data from a serial bit stream and multiple bits are usually only written to allow manageable clock frequencies for a given required bandwidth. For example data could be arriving 16 bits wide and being read 33 bits wide. In this example the FIFO 6 could appear as 33 entries each 16 bits wide to the writing clock and 16 entries each 33 bits wide to the reading clock. In this case the write to read clock frequency ratio should be 33:16 if a value is to be written and read on each cycle of the two clocks.

There are other ways different clock frequencies can be managed. The communication protocol can include mechanisms to allow small variations in clock frequency. Some include a SKIP token and this can be used by the receiver to either delete an entry and reduce the probability of an overflow if the FIFO is becoming full or fail to take a value if the FIFO is becoming close to empty allowing it to gain an extra entry.

Another commonly used method is to use a faster clock for processing the data than for transmitting or receiving the data. A receiving FIFO will always remove valid data and the transmitting FIFO will always ensure there is enough data written to the FIFO to guarantee the reading clock has valid data to send.

Figure 5:
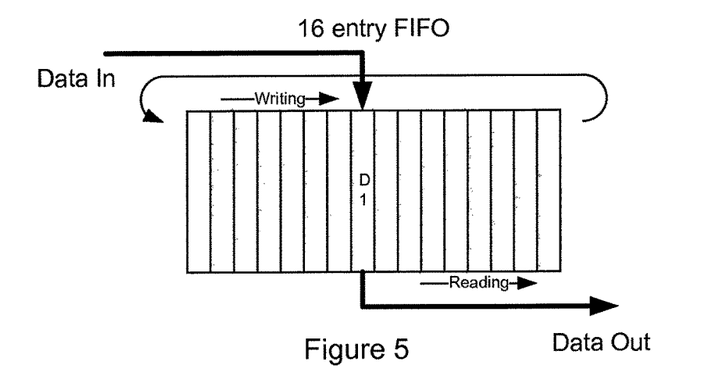

Any data sitting in a FIFO is increasing the message latency. Some designs are not very concerned with the value of the latency and these usually choose to keep the realignment FIFOs approximately half full. However, for latency critical designs, the FIFOs should be kept as near empty as possible as shown in FIG. 5 while still guaranteeing the FIFO never underflows. Sampling flip-flops must have time to settle and they can easily need 2, 3 or more cycles to allow the sampling flip-flops enough time to remove their meta-stable state. For very low latency communications using multiple stages of switching elements this additional delay can affect the performance of the whole system. With high performance SerDes this additional delay can be seen on both the RX path and the TX path doubling the penalty.

Figure 6:
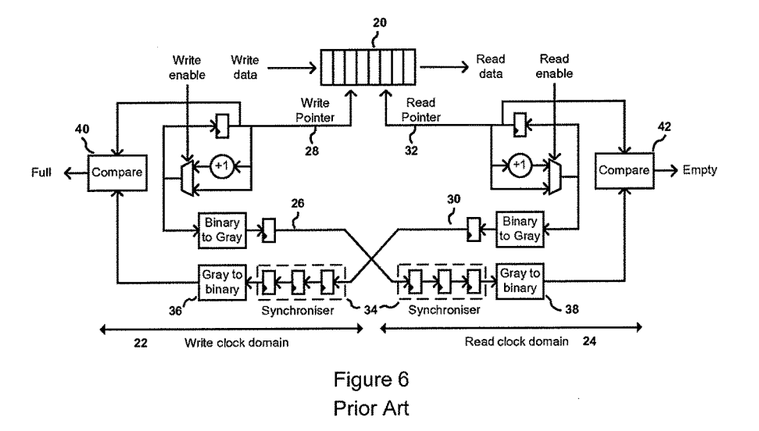
FIGS. 6 to 8 illustrate respective previously-considered schemes for transfer of data items across clock domain boundaries.

A commonly used circuit to safely move data through a FIFO 20 from one asynchronous clock domain 22 into another 24 is shown in FIG. 6. The circuit passes a Gray encoded copy 26 of a write pointer 28 into the read clock domain 24, and a Gray encoded copy 30 of the read pointer 32 into the write clock domain 22. Synchronising flip-flops 34 must be used on the Gray encoded pointer values passed into the new clock domain to prevent meta-stability problems. Once synchronised into the new clock domain, the Gray values are converted 36,38 back to binary values and compared 40,42 to the local pointer value to determine whether the FIFO 20 is full or empty. On the read side of the FIFO 20, an entry can safely be read when the FIFO 20 is not empty, and on the write side of the FIFO 20, an entry can safely be written if the FIFO 20 is not full.

This method is inherently safe as there is a delay of at least three clock cycles for the passing of the pointer value from one clock domain to the other due to the synchronisers. The cost of this safety is additional latency due to the delay through the synchronisers.

In many communications ASICs, the main system logic is operated at a higher frequency than the communications links. This allows for additional packet processing operations to be performed and a side effect is that it also permits a simplification of the clock domain crossing FIFOs between the system and link clock domains.

Figure 7:
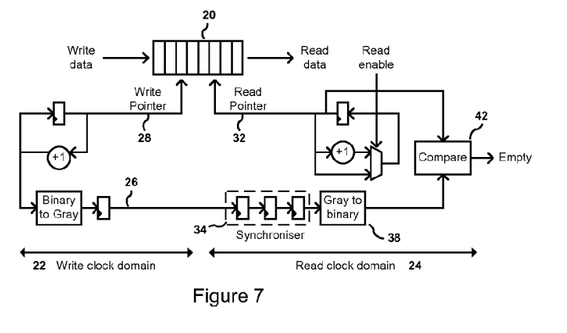

For data passing from the link clock domain into the system clock domain, there is a guarantee that the data can be read from the FIFO at a faster rate than it is written, thus ensuring that the FIFO never overflows. There is therefore no need to pass the read pointer into the write clock domain as the logic writing into the FIFO can assume that the FIFO is never full. The write pointer in the link clock domain is passed into the system clock domain to allow a read to be made as soon as data is available. This is illustrated in FIG. 7. This implementation is a simplified case of the generic clock domain crossing FIFO shown in FIG. 6 and still suffers from the problem that there is a delay due to the synchronising flip flops which causes data to remain in the FIFO for several cycles before it can be read out.

Figure 8:
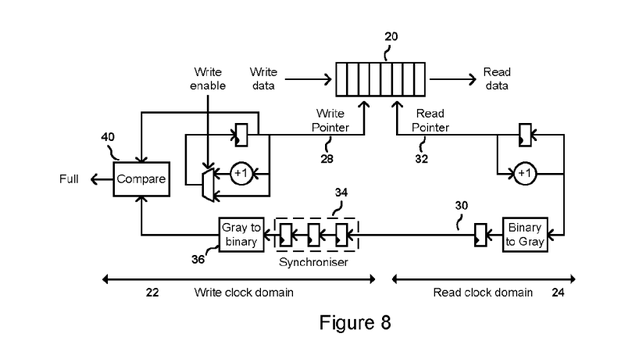

For data passing from the system clock domain into the link clock domain, the system must ensure that there is always data to read by the link clock domain but that the FIFO does not overflow. To achieve this, the read pointer is passed from the link clock domain into the system clock domain and the logic in the system clock domain can write data whenever the FIFO is not full. This is illustrated in FIG. 8. Again, this is purely a simplification of a generic clock domain crossing FIFO shown in FIG. 6, and suffers from excessive latency due to the FIFO being kept relatively full.

The implementations discussed in the prior art section are safe methods for crossing clock domains but suffer from excessive latency due to the time taken for the pointer values to pass through the synchronising flip-flops.

SUMMARY

One embodiment of the present invention can provide a method for removing the delay introduced by synchronising flip-flops in the design of clock domain crossing data FIFOs and also a method for verifying that the data has not been corrupted in the FIFO. Such a method can allow synchronisation of data across an asynchronous interface in less than a cycle while still allowing a very generous delay for predictable and safe phase measurements between the two asynchronous clocks on either side of the interface. Such a method can allow firmware to optimise dynamically the delay to the minimum possible while still allowing for clock jitter and variations in phase due to temperature process and voltage.

According to one aspect of the present invention, there is provided a data processing system comprising a first clock domain having a first clock rate, a second clock domain having a second clock rate, a data path operable to transfer data items from the first clock domain to the second clock domain, the data path comprising a buffer having an input for receiving data items from the first clock domain, and an output port for transmitting data items to the second clock domain in a first-in first-out manner, the buffer having a first pointer for indication of a current first location of the buffer, and a second pointer for indication of a current second location of the buffer, a read controller operable to define a read pattern for the buffer, to control output from the buffer in dependence upon such a read pattern, and to adjust such a read pattern in dependence upon a value of such a first pointer for the buffer.

According to another aspect of the present invention, there is provided, a method for transferring data items from a first clock domain having a first clock rate to a second clock domain having a second clock rate via a data path operable to transfer data items from the first clock domain to the second clock domain, the data path comprising a buffer having an input for receiving data items from the first clock domain, and an output port for transmitting data items to the second clock domain in a first-in first-out manner, the buffer having a first pointer for indication of a current first location of the buffer, and a second pointer for indication of a current second location of the buffer, the method comprising defining a read pattern for the buffer, controlling output from the buffer in dependence upon such a read pattern; and adjusting the read pattern in dependence upon a value of such a first pointer for the buffer.

Such a system or method enables desirably high data transfer rates with reduced latency.

In one example, the read pattern has a pattern pointer associated therewith, and the read controller is operable to compare such a pattern pointer with the first pointer, and to adjust the pattern pointer in dependence upon such a comparison.

The read controller may be operable to reset the pattern pointer in dependence upon a predetermined pattern length.

The data path may include pointer transfer means for transferring the first pointer from the first clock domain to the second clock domain. Such pointer transfer means may include an encoder and a synchroniser. In one example, the second clock rate is higher than the first clock rate, and the first pointer is a write pointer, the first location is a data input location, the second pointer is a read pointer, and the second location is an output location.

Alternatively, or additionally, the data path may include pointer transfer means for transferring the second pointer from the second clock domain to the first clock domain. Such pointer transfer means may include an encoder and a synchroniser. In one example, the second clock rate is higher than the first clock rate, and wherein the first pointer is a read pointer, the first location is a data output location, the second pointer is a write pointer, and the second location is an input location.

The buffer may define a third pointer, which is a delayed by one cycle version of the second pointer and is updated by the same clock domain as the second pointer, the third pointer being used to read data from the buffer that can be compared against a delayed by one cycle version of the data taken from the buffer using the second pointer so as to provide an underflow value indicative of an underflow error caused by latency through the buffer. Such a third pointer can be used to prevent underflow conditions.

The underflow value can be used to adjust dynamically a required buffer latency so as to minimise latency through the buffer such that substantially no underflow errors occur.

BRIEF DESCRIPTION OF THE DRAWINGS

These and other aspects of the invention will now be described, by way of example only, and with reference to the accompanying drawings, in which.

DETAILED DESCRIPTION

Figure 9:
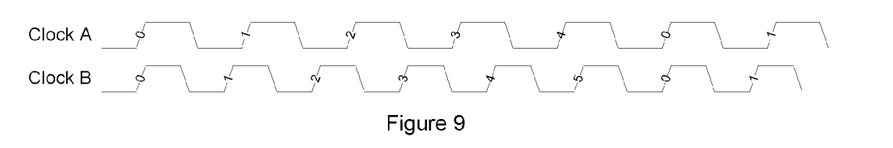
FIGS. 9 to 11 illustrate respective clock signal patterns.

Consider the two clock signals shown in FIG. 9. Clock A is slower than clock B and has exactly five periods for every six periods of clock B. Clock A represents the link clock, and clock B represents the system clock.

If the writes are happening on the slower clock (clock A), and the reads are happening on the faster clock (clock B), and assuming that the width of data written into the FIFO is the same as the width of data read out from the FIFO then, if a write is occurring on every cycle of clock A, a read only needs to be performed on five out of every six cycles of clock B. Reads could continue indefinitely following the same pattern of five reads in a six cycle period without the FIFO either overflowing or under running. The process of reading from the FIFO does not need to be in response to a change in the synchronised copy of the write pointer and thereby subjected to the delay of the synchronising flops. This is only possible because it is guaranteed, and therefore predictable, that a write will occur on every cycle of the slower clock.

Whilst the method described above decouples the reads from the writes and ensures that the FIFO will never overflow or under run, it will be appreciated that an additional mechanism to control the separation of the read and the write pointers is desirable.

The mechanism to ensure that the read and the write pointers are correctly spaced is to pass the write pointer into the read clock domain and to observe at what point in the sequence of reads that the zero entry is written. If the pointers are minimally spaced then the logic in the read clock domain should observe that the write pointer has a value of zero when the read clock is on its third cycle. If the read logic does not observe this is the case then the pointers are not correctly spaced, and they need to be adjusted. An adjustment to the pointers can be made by shortening the repeating pattern of reads by one cycle by omitting the cycle where no read is made.

Assuming that no read is performed in cycle 0 of clock B, and that entry 0 of the FIFO is written in cycle 0 of clock A then entry 0 of the FIFO can safely be read in cycle 1 of clock B. Reads can also be performed in cycles 2, 3, 4, and 5 of clock B to read out the data written in cycles 1, 2, 3, and 4 of clock A. This assumes that the smallest time between the write and the read of an entry (which occurs between the write on cycle 4 in clock A and the read on cycle 5 in clock B) does not violate register timing. The pattern of five reads over six cycles, with no read in cycle 0 can be repeated indefinitely once the start of the repeated pattern of reads has been aligned to the repeating pattern of writes.

In most implementations, the relationship between clock A and clock B is not an exact multiple as was the case in the example discussed in this section. This could be because the designer wishes to use a system clock frequency of a particular value that is not a convenient multiple of the link clock or it could be because the link protocol specifies that a clock frequency tolerance of 200 parts per million is allowed, thereby meaning that an exact multiple is not possible. For these cases a similar approach can still be adopted and it is for these cases that the embodiment described below can provide a solution.

Figure 10:
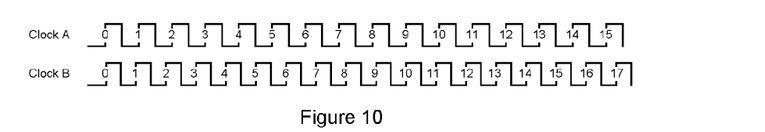

Consider the clocks shown in FIG. 10. Clock A represents the link clock and is used to write data into the FIFO. Clock B represents the system clock and is used to read data from the FIFO. In this example, sixteen cycles of clock A (the writing clock) occur in a time that is between seventeen and eighteen cycles of clock B (the reading clock). Note that this is because there is not an exact multiplier between the two clocks. Those who are skilled in the art will realise that if a repeating pattern of sixteen reads during a seventeen cycle period is applied on the read side of the FIFO (in the clock B domain) then the FIFO will slowly drain until empty and then under run. Similarly, if a repeating pattern of sixteen reads during an eighteen cycle period is applied on the read side of the FIFO then the FIFO will slowly fill until it overflows.

Figure 11:
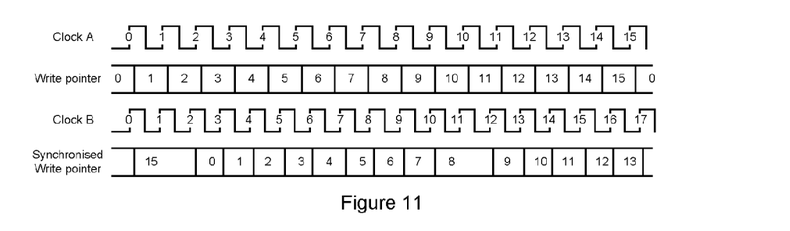

One aspect of this embodiment is that the safe pattern (sixteen reads over eighteen cycles in this example) is repeated and then changed to the shorter version (sixteen reads over seventeen cycles) in response to detecting that the read and write pointers are not optimally positioned To monitor the spacing of the read and write pointers, a Gray coded version of the write pointer is passed through a synchroniser into the reading clock domain. In the ideal case shown in FIG. 11, where the latency through the FIFO has been minimised, the logic in the read clock domain should observe a value of zero for the synchronised write pointer in cycle 3 of the repeating pattern. If a value of zero for the write pointer is observed in cycles 0, 1, or 2 of the repeating pattern, then the pattern needs to be shortened by one cycle in the following repetition.

A similar approach is used for the case where data is being written in a faster clock domain to that which it is being read. Assuming that a read is occurring on every cycle of the slower clock, a repeating pattern of writes is chosen such that the FIFO will slowly fill. By passing the read pointer from the read clock domain back into the write clock domain, the logic in control of the writes can monitor where the read pointer is in relation to the write pointer. Specifically, by monitoring the position in the repeating pattern of writes where the writing logic observes that the zero entry is read, the pattern can be extended by an occasional additional cycle where no write is performed. This has the effect of shrinking the gap between the write and read pointers and therefore minimising the latency.

Another aspect of the invention is a method to verify that the logic has not been configured correctly such that timing violations are occurring between the writing and the reading of an entry. This can happen if the read is occurring too close to the write.

Figure 12:
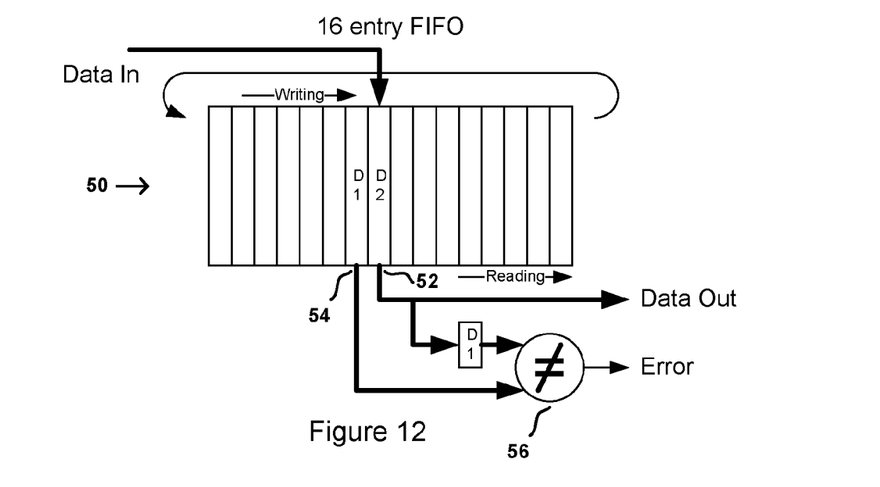
FIG. 12 illustrates a first-in first-out buffer having output data checking logic.

As illustrated in FIG. 12, timing verification logic adds an additional secondary read port 54 onto the FIFO 50, which is addressed using a delayed copy of the read pointer used for the primary read port 52. The delayed pointer is delayed by one cycle. The data read using the delayed pointer is then compared 56 to a delayed copy of the data read in the previous cycle by the primary read port 52. If a mismatch is detected then an underflow error has occurred.

This mechanism can be used to minimise the latency through the buffer. Firmware can set an initial value to the latency through the buffer that is expected to be error free. Then the firmware can start to reduce the latency value slowly, one delay value at a time. Eventually the delayed read pointer value will not match the copy of the data taken from the previous cycle indicating that an underflow error has occurred. The firmware can then add back the final reduced latency value. This should result in the minimum possible latency through the clock crossing buffer whilst still giving error free operation.

Figure 13:
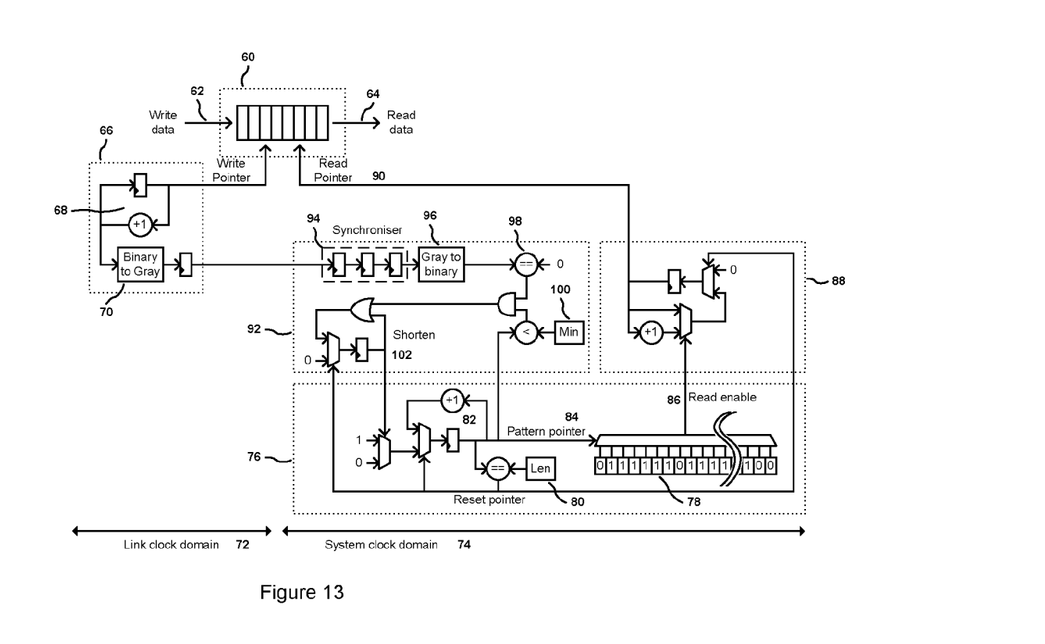
FIG. 13 illustrates a scheme embodying one aspect of the present invention.

FIG. 13 illustrates one embodiment that enables data items to cross from a link clock domain 72 into a faster system clock domain 74. There are five parts to the design. The data FIFO 60 is a two port memory with one write port 62 and one read port 64. The depth of the FIFO 60 in the embodiment shown is 8 entries, but it will be readily appreciated that the principles described here are appropriate to a FIFO of any size. Write pointer logic 66 is clocked in the link clock domain 72 and consists of a free running four bit counter 68 that counts from 0 to 15. The output value of the counter 68 is Gray encoded 70 and passed over to the system clock domain 74. Only the lower three bits of the counter are required to form the write pointer into the data FIFO 60.

In the system clock domain 74, read pattern logic 76 consists of a software programmable register 78 that contains the desired pattern of reads. A second register 80 contains the length of the pattern (marked 'Len'). A free running counter 82 clocked by the system clock increments until it reaches the value specified in the length register 80, at which point it is reset. The output of the counter 82 is also used as a pointer 84 into the read pattern register 78 to select a bit that is used as a read enable from the FIFO 60.

A read enable signal 86 from the read pattern logic 76 is used both to enable reading the data from the FIFO 60 and to increment the read pointer 90 in read pointer logic 88. The read pointer 90 is reset to zero when the pattern pointer 84 reaches the maximum value specified in the Len register 80. The final component is pointer spacing logic 92 which is used to decide when to shorten the repeating read pattern stored in the pattern register 78.

A synchroniser 94 is used to bring the Gray coded write pointer in to the system clock domain 74. The Gray value is then converted 96 into a binary value and a check 98 is made for the pointer equalling zero. If, when the synchronised write pointer equals zero, the pattern pointer 84 is less than a programmable minimum value 100 (labelled 'Min') then the pointers are too far apart and have to be brought closer together by shortening the pattern by one cycle. A register 102 is set to indicate that the repeating pattern should be shortened at its next iteration. The shorten register 102 is reset to zero when the pattern pointer 84 reaches its maximum value. If the shorten register 102 is set when the pattern pointer 84 is reset, then the pattern pointer 84 is reset to one rather than zero. This has the effect of shortening the repeating pattern by one cycle. Note that bit zero of the read pattern register cannot be set to a one otherwise a read will not be performed when the pattern is shortened.

Figure 14:
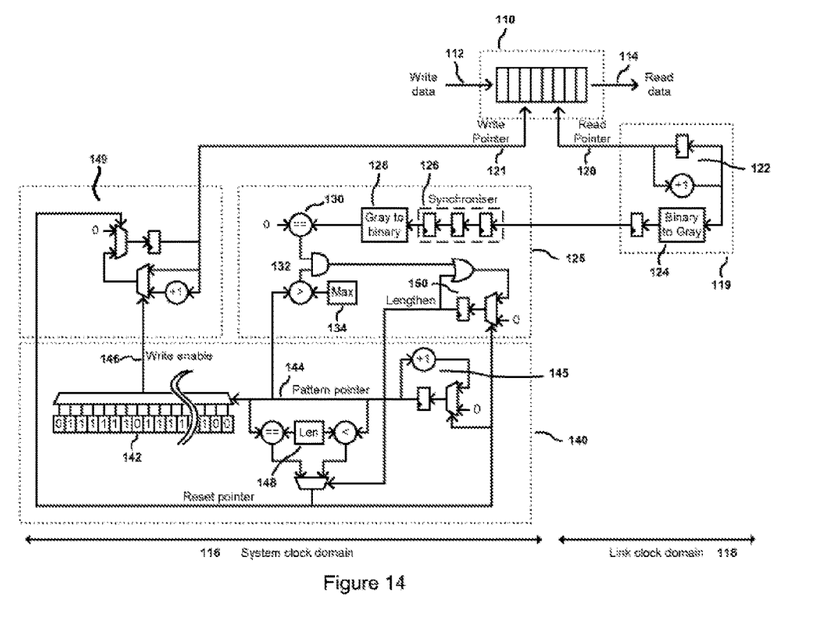
FIG. 14 illustrates a scheme embodying another aspect of the present invention.

FIG. 14 shows a variation of the FIG. 13 scheme. The FIG. 14 scheme is for use when data items cross from the system clock domain 116 into the slower link clock domain 118. In this case, a read from FIFO 110 is performed on every cycle of the link clock domain 118.

In the FIG. 14 example, the read pointer 120 is provided by the read pointer logic 119, and specifically the output of a four bit free running counter 122. The bottom three bits are used to address the FIFO 110. The four bit value is Gray encoded 124 and passed into pointer spacing logic 125 within the system clock domain 116 via a synchroniser 126, and binary conversion 128. A comparison 130 is made to identify when the value of the synchronised read pointer is zero. When the synchronised read pointer is zero, a check 132 is made of the pattern pointer 144 received from read pattern logic 140, against a maximum value 134 (labelled Max). If the pattern pointer 144 is greater than the maximum value then a register 150 is set to effect a lengthening of the repeating write pattern, which effectively slows the filling of the FIFO 110 and moves the read and write pointers 120,121 closer together. The lengthen register 150 is cleared when the pattern pointer 144 is reset.

The pattern pointer 144 is provided by the output of a free running counter 145 that is reset to zero and is reset either when it reaches a programmable value 148 (marked Len) or when it exceeds the programmable value. A programmable register 142 contains the pattern of write enables for the repeating pattern. A write enable signal 146 is then provided to write pointer logic 149 for use in producing write pointer 121.

It will be appreciated that the two versions presented here (in FIGS. 13 and 14 respectively) could be combined into a single implementation where the repeating pattern is either lengthened or shortened depending on whether the synchronised pointer from the other side of the FIFO is above or below some programmable thresholds.

Similarly, the embodiments presented here are for the case where accesses to the FIFO in the link clock domain are made on every cycle of the link clock, but more complex patterns can be used. A simple alternative is a write being performed every other cycle of the link clock, if the FIFO data width is twice that of the communications data. More complex patterns can also be used. For example, the communications link could have a 20 bit interface, whilst the FIFO interface is 32 bits. In that case a repeating pattern of writes will occur every 32 cycles of link clock, over which time there will be a total of 20 writes to the FIFO.

Although aspects of the invention have been described with reference to the embodiments shown in, and described with reference to, the accompanying drawings, it is to be understood that the invention is not limited to the precise embodiment shown and that various changes and modifications may be effected without further inventive skill and effort.

The invention claimed is:

1. A data processing system comprising:
a first clock domain having a first clock rate;
a second clock domain having a second clock rate;
a data path operable to transfer data items from the first clock domain to the second clock domain, the data path comprising a buffer having an input for receiving data items from the first clock domain, and an output port for transmitting data items to the second clock domain in a first-in first-out manner, the buffer having a first pointer for indication of a current first location of the buffer, and a second pointer for indication of a current second location of the buffer;
a read controller configured to define a read pattern for the buffer dependent upon the first clock rate and the second clock rate, to control output from the buffer in dependence upon such a read pattern, to monitor the value of the first pointer of the buffer and to adjust the read pattern as needed in dependence upon a value of the first pointer of the buffer, so as to avoid buffer overrun or buffer overflow.

2. The system of claim 1, wherein the read pattern has a pattern pointer associated therewith, the read controller being configured to compare such a pattern pointer with the first pointer, and to adjust the read pattern in dependence upon such a comparison.

3. The system of claim 1, wherein the read pattern has a pattern pointer associated therewith, and wherein the read controller is operable to reset the pattern pointer in dependence upon a predetermined pattern length.

4. The system of claim 1, wherein the data path includes pointer transfer means for transferring the first pointer from the first clock domain to the second clock domain.

5. The system of claim 4, wherein the pointer transfer means includes an encoder and a synchroniser.

6. The system of claim 4, wherein the second clock rate is higher than the first clock rate, and wherein the first pointer is a write pointer, the first location is a data input location, the second pointer is a read pointer, and the second location is an output location.

7. The system of claim 1, wherein the data path includes pointer transfer means for transferring the second pointer from the second clock domain to the first clock domain.

8. The system of claim 7, wherein the pointer transfer means includes an encoder and a synchroniser.

9. The system of claim 7, wherein the second clock rate is higher than the first clock rate, and wherein the first pointer is a read pointer, the first location is a data output location, the second pointer is a write pointer, and the second location is an input location.

10. The system of claim 1, wherein the buffer has a third pointer, which is a delayed by one cycle version of the second pointer and is updated by the same clock domain as the second pointer, the third pointer being used to read data from the buffer that can be compared against a delayed by one cycle version of the data taken from the buffer using the second pointer so as to provide an underflow value indicative of an underflow error caused by latency through the buffer.

11. The system of claim 10, wherein the underflow value is used to adjust dynamically a required buffer latency so as to minimise latency through the buffer such that substantially no underflow errors occur.

12. A method for transferring data items from a first clock domain having a first clock rate to a second clock domain having a second clock rate via a data path operable to transfer data items from the first clock domain to the second clock domain, the data path comprising a buffer having an input for receiving data items from the first clock domain, and an output port for transmitting data items to the second clock domain in a first-in first-out manner, the buffer having a first pointer for indication of a current first location of the buffer, and a second pointer for indication of a current second location of the buffer, the method comprising:
defining a read pattern for the buffer which is dependent upon the first clock rate and the second clock rate;

controlling output from the buffer in dependence upon such a read pattern;

monitoring a value of the first pointer for the buffer, and adjusting the read pattern in dependence upon the value of the first pointer for the buffer so as to avoid overrun or overflow of the buffer, wherein the read pattern has a pattern pointer associated therewith, a read controller being configured to compare such a pattern pointer with the first pointer, and to adjust the read pattern in dependence upon such a comparison.

13. The method of claim 12, further comprising resetting the pattern pointer in dependence upon a predetermined pattern length.

14. The method of claim 12, further comprising transferring the first pointer from the first clock domain to the second clock domain via the data path.

15. The method of claim 14, further comprising encoding and synchronising the first pointer.

16. The method of claim 14, wherein the second clock rate is higher than the first clock rate, and wherein the first pointer is a write pointer, the first location is a data input location, the second pointer is a read pointer, and the second location is an output location.

17. The method of claim 12, further comprising transferring the second pointer from the second clock domain to the first clock domain.

18. The method of claim 17, further comprising encoding and synchronising the second pointer.

19. The method of claim 17, wherein the second clock rate is higher than the first clock rate, and wherein the first pointer is a read pointer, the first location is a data output location, the second pointer is a write pointer, and the second location is an input location.

20. The method of claim 12, further comprising providing a third pointer, which is a delayed by one cycle version of the second pointer and is updated by the same clock domain as the second pointer, the third pointer being used to read data from the buffer that can be compared against a delayed by one cycle version of the data taken from the buffer using the second pointer so as to provide an underflow value indicative of an underflow error caused by latency through the buffer.

21. The method of claim 20, wherein the underflow value is used to adjust dynamically a required buffer latency so as to minimise latency through the buffer such that substantially no underflow errors occur.

22. A data processing system comprising:
a first clock domain having a first clock rate;
a second clock domain having a second clock rate;
a data path operable to transfer data items from the first clock domain to the second clock domain, the data path comprising a buffer having an input for receiving data items from the first clock domain, and an output port for transmitting data items to the second clock domain in a first-in first-out manner, the buffer having a first pointer for indication of a current first location of the buffer, and a second pointer for indication of a current second location of the buffer, and wherein data path further includes pointer transfer means for transferring the first pointer from the first clock domain to the second clock domain;
a read controller configured to define a read pattern for the buffer which is dependent upon the first clock rate and the second clock rate, to control output from the buffer in dependence upon such a read pattern, to monitor the value of the first pointer of the buffer, wherein the read pattern has a pattern pointer associated therewith, the read controller being further configured to compare such a pattern pointer with the first pointer, and to adjust the read pattern in dependence upon such a comparison so as to avoid buffer overrun or buffer overflow.

* * * * *